United States Patent [19]

Dissett

[11] 3,931,872

[45] Jan. 13, 1976

[54] REVERSIBLE OVERRUNNING CLUTCH WITH AUTOMATIC SHIFT CONTROL AND FRICTION REDUCING MEANS

[75] Inventor: Walter L. Dissett, Southfield, Mich.

[73] Assignee: Aspro, Inc., Westport, Conn.

[22] Filed: June 13, 1974

[21] Appl. No.: 478,933

[52] U.S. Cl. ............. 192/43; 192/48.91; 192/67 A; 308/4 R; 308/6 B
[51] Int. Cl.² ................... F16D 41/00; F16D 11/04; F16C 17/02
[58] Field of Search................ 192/43, 48.91, 67 A; 308/6 R, 6 B, 4 R

[56] References Cited
UNITED STATES PATENTS

| 3,353,876 | 11/1967 | Moyer | 308/6 B |
|---|---|---|---|
| 3,620,133 | 11/1971 | Feucht | 308/4 R X |
| 3,651,907 | 3/1972 | Myers, Sr. | 192/67 A X |
| 3,743,067 | 7/1973 | Bokovoy | 192/67 A X |

Primary Examiner—Allan D. Herrmann
Attorney, Agent, or Firm—Lawrence E. Laubscher

[57] ABSTRACT

An improved reversible overrunning clutch is disclosed of the type including a central driver member that is axially shiftable by helical spline means between clutch engaged positions relative to axially spaced forward and reverse clutch members, respectively, mounted on an output shaft. Automatic shift control means operable in accordance with the direction of rotation of the rotary input drive means are provided for shifting the central driver member toward a readiness position immediately adjacent the appropriate clutch member, thereby insuring the correct directional operation of the unit. In order to maintain the central driver member in position, friction drag spring means are provided which afford rotational resistance between the central drive member and the output shaft. In accordance with a characterizing feature of the invention, anti-friction means are provided for reducing the axial component of friction between the friction drag spring means and the output shaft, whereby the deleterious effect of the friction drag spring means on the central drive member is alleviated.

8 Claims, 17 Drawing Figures

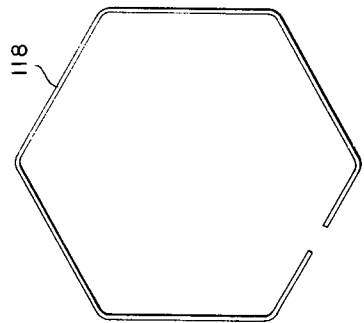
Fig. 7
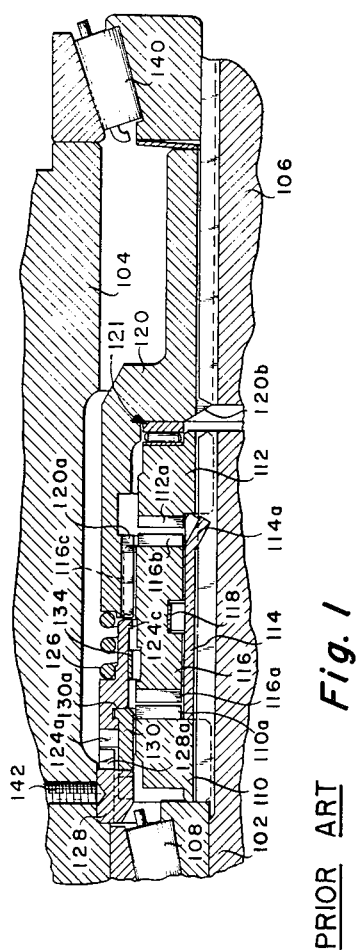
PRIOR ART  Fig. 1
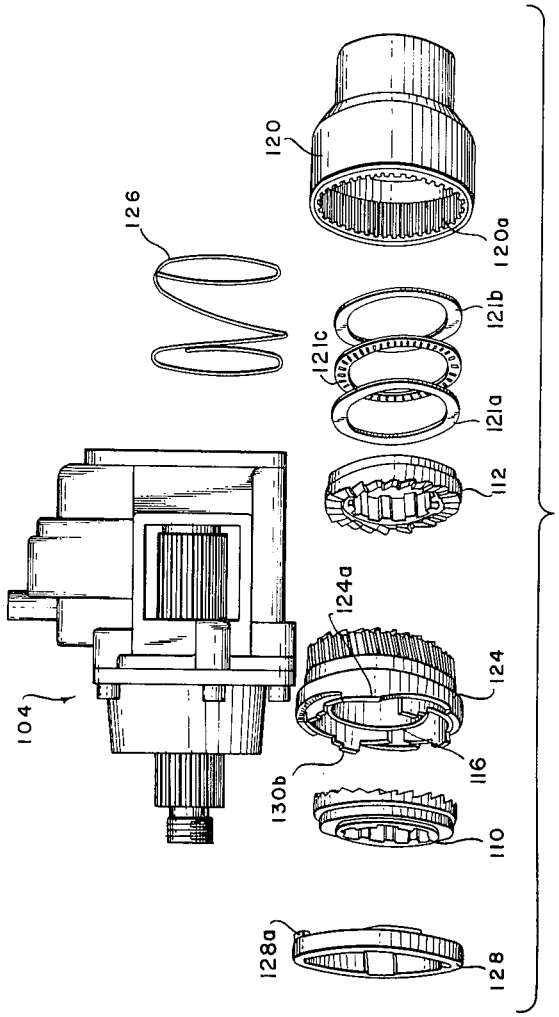
Fig. 6

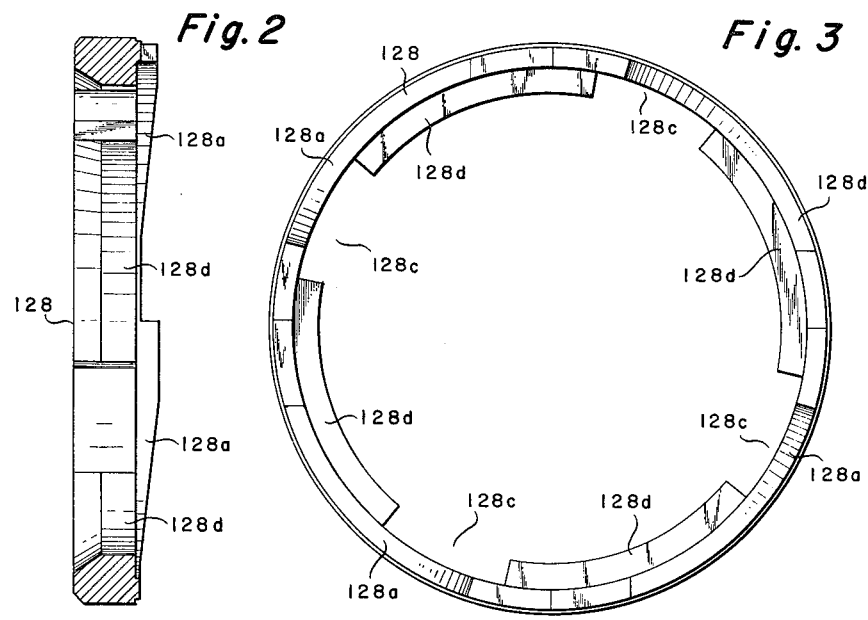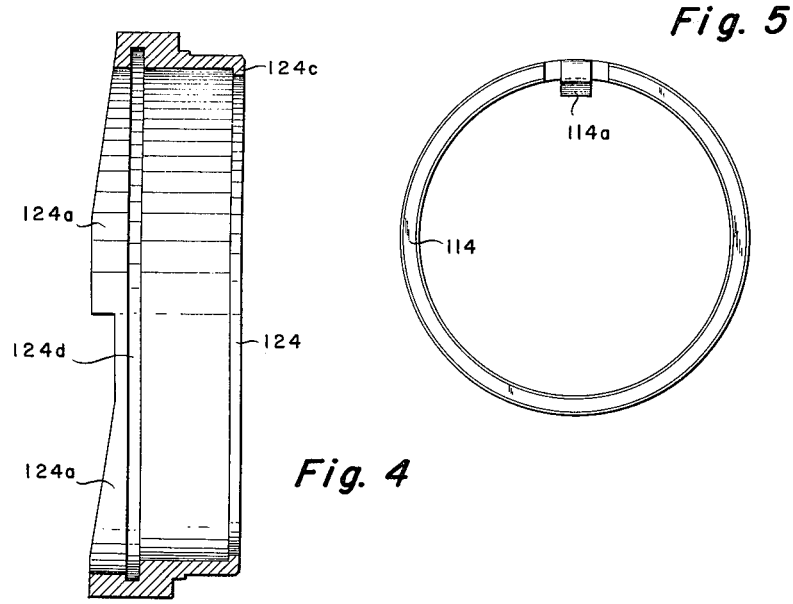

Fig. 12
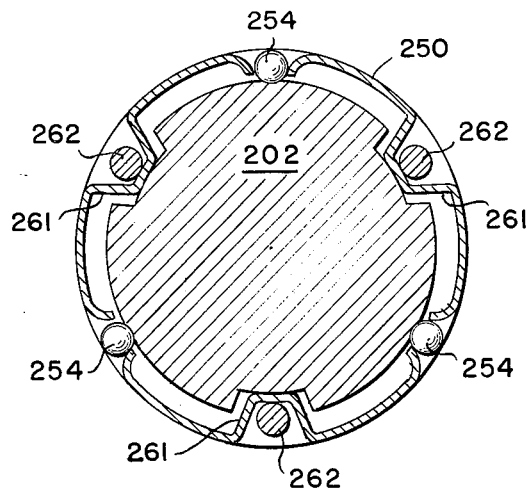
Fig. 13
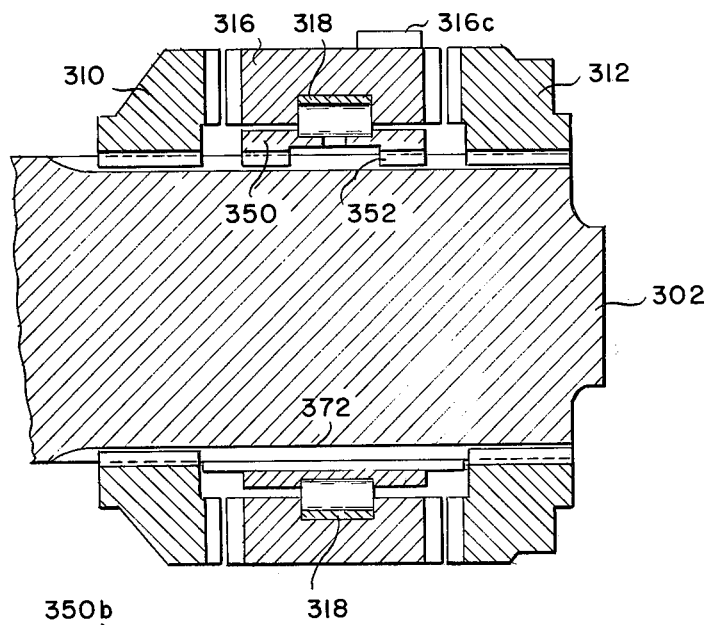
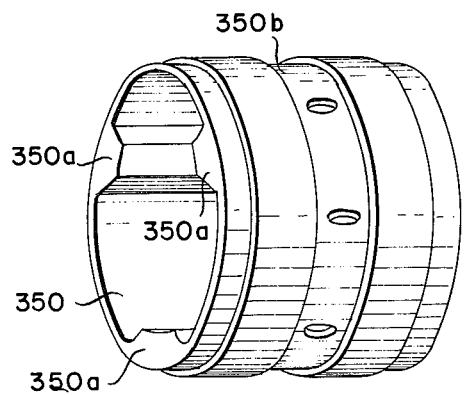
Fig. 14

REVERSIBLE OVERRUNNING CLUTCH WITH AUTOMATIC SHIFT CONTROL AND FRICTION REDUCING MEANS

In the prior U.S. patent of Albert F. Myers, U.S. Pat. No. 3,651,907 of Mar. 28, 1972, an overrunning clutch for a transfer case transmission is disclosed in which a central driver member is axially shifted by helical spline means into clutching engagement with the appropriate one of spaced forward and reverse clutch members mounted on an output shaft. Holdout ring means are provided that are operable when the speed of rotation of a driven shaft is greater than that of a driving shaft for maintaining the central driver member in an intermediate disengaged position relative to said forward and reverse clutch members. Furthermore, it has been proposed in the prior U.S. patent of Ronald D. Bokovoy, U.S. Pat. No. 3,743,067, to increase the reliability and speed of operation of the prior overrunning clutch construction by causing the central driver member, when in an overrunning disengaged condition, to be axially shifted toward a readiness position immediately adjacent the appropriate clutch member. To this end, automatic shift control means are provided for displacing the central driver member axially toward a readiness position relative to the appropriate one of spaced forward and reverse clutch members. Consequently, during normal operation of the overrunning clutch means — when the front (or rear) drive axle of the motor vehicle overrruns the rear (or front) axle by a predetermined desired amount (on the order of 3% to 6%) — the central driver member is shifted toward the appropriate readiness position in accordance with the direction of rotation of the rotary input drive means. consequently, when the rear (or front) wheels momentarily lose traction and it is desired to transfer drive torque to the overrunning front (or rear) axle, the thrust imparted to the central driver via the helical spline teeth that connects the driving and central driver members is sufficient to displace axially the central driver member from the readiness position to the immediately adjacent clutch engaged position. The automatic shift control means further includes an annular shift control cam member secured at one end to or part of the housing in which the output shaft of the clutch is journalled, and an annular shift control member arranged colinearly at the other end of said cam member, said cam and shift control members being resiliently biased together and provided at adjacent ends with cooperating overrunning cam teeth. Holdout ring means are provided for maintaining the shift control member in a first enabling position relative to one of said forward and reverse clutch members, said central driver member being connected with said shift control member for limited axial displacement between a retracted readiness position and an extended clutch engaging position. Upon rotation of the driving member in the opposite direction, the holdout ring means is released and the engagement of the cam teeth causes the shift control member to be axially displaced towards a second enabling position relative to the other clutch member. First friction drag spring means are provided for retarding the rotational movement of the central driver relative to the output shaft and also the axial displacement of the central driver during corresponding displacement of the shift control member, thereby assuring that the central driver is normally in the retracted readiness position relative to the shift central member and the appropriate clutch member. Second friction drag spring means are provided for retarding the rotational and axial displacement of the shift control member relative to the central driver member.

One problem experienced by this known reversible overrrunning clutch arrangment is that the restraining forces applied to the central driver member by the first and second friction drag spring means are so strong as to impede or otherwise interfere with the accurate axial shifting and positioning of the central driver member. In order to partially eliminate this problem, it has been proposed to relocate the second friction drag spring means that operate on the shift control member from a first position between the central driver member and the shift control member to a second position between the shift control member and an annular retainer sleeve arranged concentrically thereabout. While this relocation partially alleviates the problem, it is further desirable to reduce or eliminate the axial frictional component applied to the central driver member by the first friction drag spring means without interfering with the desired rotational drag resistance between the central driver member and the output shaft.

Accordingly, a primary object of the present invention is to provide friction-reducing sleeve means for reducing the axial component of friction of the first friction drag spring means without reducing the rotational drag resistance between the central driver member and the output shaft. To this end, an axially shiftable sleeve is arranged concentrically between the central driver member and the output shaft, said sleeve being non-rotatably connected with the output shaft and being axially shiftable between the forward and reverse clutch elements. The first friction drag spring means are arranged between the sleeve and the central driver member for effecting simultaneous axial displacement of the components and for establishing rotational drag resistance between the central driver member and the output shaft. Anti-friction means connected with and positively confined within the sleeve are provided for substantially eliminating the axial component of friction between the sleeve and the output shaft. In a first embodiment of the invention, the sleeve is stamped from sheet metal and the anti-friction means comprises a plurality of ball bearings positively confined in caged openings contained in the sleeve. In a second embodiment, the sleeve is provided with internal splines that are adapted to extend within corresponding grooves contained in the output shaft, said anti-friction means comprising at least one layer of a synthetic plastic material secured to the splines and having a low coefficient of friction for reducing axial friction between the splines and the grooves in the output shaft.

In accordance with a more specific object of the invention, the outer periphery of the sleeve contains an annular groove, and the friction drag spring means comprises a generally annular non-circular flat drag spring that is arranged between the sleeve and the central driver member, said drag spring extending within the groove and being prevented from axial displacement relative to the sleeve.

In accordance with another object of the invention spacer rods are contained within the sleeve and extend axially beyond the ends of the sleeve into abutting engagement with the forward and reverse clutch member to maintain constant the spacing distance therebetween. In the first sleeve embodiment, the spacer rods are slidably received in openings contained in the inner lugs that prevent rotation between the sleeve and the output shaft, and in the second embodiment the spacer rods are at least partially received in longitudinal grooves contained in the output shaft.

Other objects and advantages of the present invention will become apparent from a study of the following specification when viewed in the light of the accompanying drawing, in which:

FIG. 1 is a longitudinal sectional view of the reversible overrunning clutch means of the prior art;

FIGS. 2 and 3 are longitudinal and end elevation views respectively, of the shift control cam means of FIG. 1;

FIG. 4 is a longitudinal sectional view of the shift control member of FIG. 1;

FIG. 5 is a longitudinal sectional view of the spacer member of FIG. 1;

FIG. 6 is an exploded view of the apparatus of FIG. 1.

FIG. 7 is an end elevational view of the friction drag spring means of FIG. 1;

FIG. 12 is a sectional view of the sleeve of FIG. 9 and spacer rods non-rotatably assembled upon the output shaft;

FIG. 13 is a longitudinal sectional view of a second embodiment of the reversible overrunning clutch means of the present invention including a friction-reducing splined sleeve;

FIG. 14 is a perspective view of the friction-reducing splined sleeve means of FIG. 13.

Figure 8:
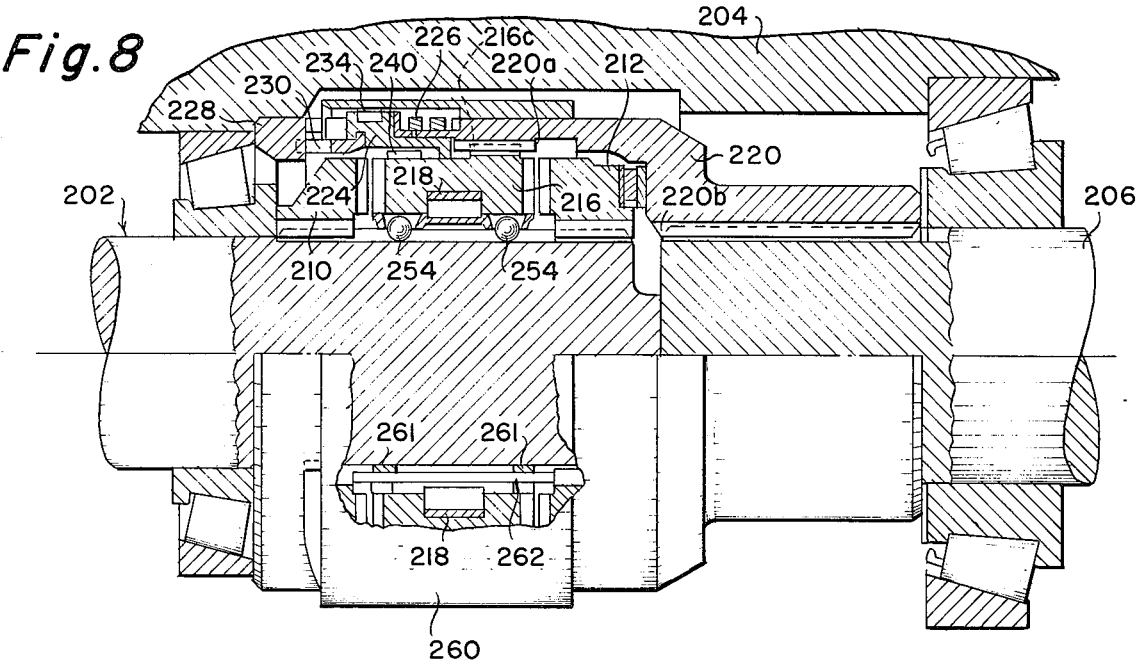
FIG. 8 is a longitudinal sectional view of a first embodiment of the improved reversible overrunning clutch means of the present invention.
Figure 9:
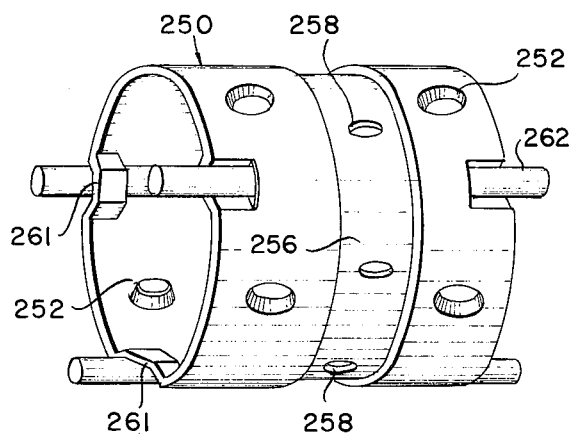
FIG. 9 is a perspective view of the stamped sleeve means of FIG. 8 with the longitudinal spacer rods attached.
Figure 10:
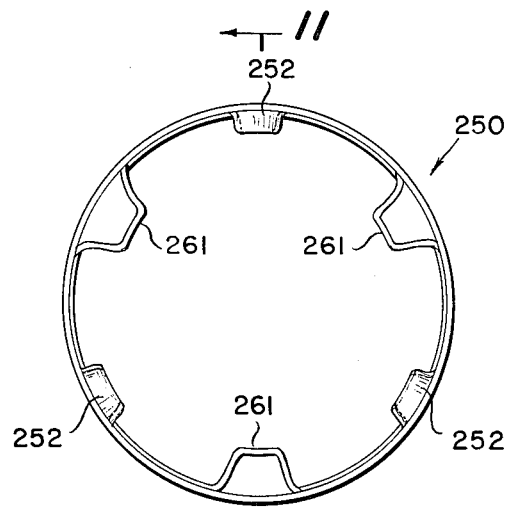
FIG. 10 is an end view of the stamped sleeve.
Figure 11:
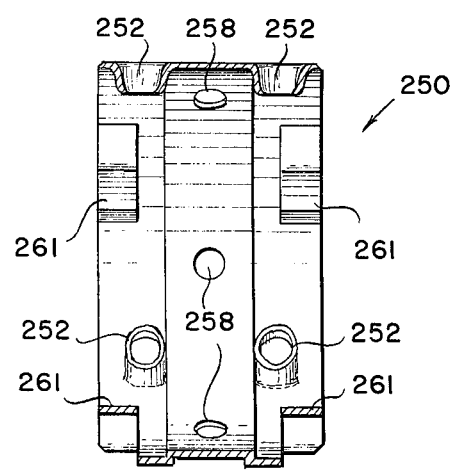
FIG. 11 is a sectional view taken along line 11—11 of FIG. 10.

Referring first more particularly to FIGS. 1–7 which illustrate the reversible overrunning clutch means of the prior art (as disclosed in the Bokovoy U.S. Pat. No. 3,743,067), a pair of colinearly arranged output and input shafts 102 and 106 are journalled in front axle disconnect housing 104 by bearings 108 and 140, respectively, said shafts being adapted for connection with the front and rear axles of the vehicle, respectively. Keyed to the input shaft by teeth 120b is the input driving hub 120 having at one end an annular portion that extends concentrically about the reversible overrunning clutch means, said annular portion including on its inner periphery circumferentially arranged helical spline teeth 120a that engage corresponding helical spline teeth 116c carried by the outer periphery of the central driver. In this embodiment the spline teeth 120a, 116c have a helix angle of 15°.

The reversible overrunning clutch means include a spacer member 114 that is arranged between the reverse and forward clutch members 110 and 112, respectively. As shown in FIGS. 1 and 5, the tubular spacer member 114 has smooth inner and outer peripheral surfaces, said spacer member being provided at one end with a deformed tongue portion 114a that extends between the spline teeth on the output shaft 102. Thrust bearing means 121 including washers 121a and 121b on opposite sides of roller bearing cage 121c (FIG. 6) are arranged between clutch member 112 and driving hub 120 as shown in FIG. 1.

The automatic shift control means for axially displacing the central driver 116 toward the readiness positions adjacent the forward and reverse clutch members, respectively, includes a stationary shift control cam member 128 that is rigidly connected with the housing 104 by set screw means 142. As shown in FIGS. 2 and 3, the cam member is provided at its right hand end with a circular series of overrunning self-disengaging cam teeth 128a that engage corresponding cam teeth 124a on the shift control member 124 (FIGS. 1 and 4). As shown in FIG. 3, the cam member is provided on its inner periphery with a plurality of spaced slots 128c that define radially inwardly extending projections 128d in indexed relation relative to the corresponding axial projections 130b on the holdout ring 130. At its right hand end, the shift control member 124 has a radially inwardly directed flange portion 124c adapted to abut the adjacent ends of the helical spline teeth 116c on the central driver 116, said shaft control member containing on its inner periphery the groove 124d for rotatably receiving the external flange 130a of the holdout ring 130. First friction drag spring 118 (FIG. 7) frictionally resists axial and rotational displacement of central drive member 116 relative to spacer member 114, and second friction drag spring 134 frictionally resists axial and rotational displacement of shift control member 124 relative to central driver 116.

The operation of the embodiment of FIG. 1 is as follows. As long as the driving member 120 is driven by input shaft 106 in the forward direction and the front axle overruns the rear axle by the desired slight amount, the central driver member 116 is placed in the illustrated disengaged condition by the overrunning self-disengaging operation of the clutch teeth. Owing to the cooperation between cam teeth 128a and 124a, shift control member 124 is axially shifted to the right against the restoring force of spring 126 toward a first enabling position relative to forward clutch 112. During this right hand movement of the shfit control member, the flange portion 124c thereof engages the helical spline teeth 116 on the central driver, thereby axially shifting the central driver toward a first readiness position relative to the forward clutch 112. The holdout ring 130 operates to maintain the shift control sleeve 124 and the central driver member 116 in the first enabled and first readiness positions, respectively.

In the event that the rear wheels momentarily lose traction, central driver 116 is shifted to the right—owing to the thrust imparted thereto by the helical spline teeth 120a and 116c— *to effect driving engagement between clutch teeth 116b and 112a*, whereby output shaft 102 will transmit driving torque to the front wheels of the vehicle. When the rear wheels resume traction, the central driver is shifted to the left by the self-disengaging clutch teeth, whereby the front wheels again overrun the rear wheels by the desired slight amount.

When the direction of rotation of input shaft 106 and hub 120 is reversed, the holdout ring is angularly rotated to the released position relative to the radial projections on shift control cam member 128, whereupon owing to the resilient biasing force of spring 126 and the camming action of cam teeth 124a, 128a, shift control member 124 is shifted to the left to a second enabled position relative to the reverse clutch member 110. During this left hand movement of the shift control member, friction drag spring 34, which has a configuration similar to that of FIG. 7, is engaged by shoulder 124c, whereby the central driver 116 is shifted to the left to a readiness position relative to the reverse clutch member. Upon loss of traction by the rear wheels, central driver is shifted by spine teeth 116c, 120a into clutching engagement with the reverse clutch member. When the rear wheels require traction, the self-disengaging clutch teeth return the central drive to the disengaged position of FIG. 1.

Referring now to the present invention as illustrated in FIG. 8, it will be seen that in order to partially reduce the axial frictional forces applied by the friction drag spring means to the central driver member 216, the second friction drag spring 234 has been relocated to a concentrically arranged position between the shift control member 224 and an outer retainer sleeve 260 mounted on the outer periphery of the input driving hub 220. A ring 240 is pressed upon the central driver member 216 and performs the axial restraining function relative to the shift control member 234 that was performed by the outer drag spring 134 of FIG. 1.

In accordance with a characterizing feature of the present invention, the effect of the axial frictional force of the first friction drag spring 218 is substantially eliminated by the provision of annular friction-reducing sleeve means intermediate the central driver member and the output shaft, said sleeve means being keyed or piloted for axial sliding movement relative to the output shaft simultaneously with the central driver member. Friction-reducing means are connected with and constrained within the sleeve for reducing the forces of friction between the sleeve and the output shaft. Referring now to FIGS. 8–12, the sleeve 250 is stamped from tubular sheet metal stock and contains a plurality of stamped cage openings 252 for receiving in a constrained manner ball bearings 254. Intermediate its ends, the sleeve is provided with an external groove 256 for receiving a portion of the first friction drag spring 218, thereby to prevent axial displacement of the spring relative to the sleeve. Access openings 258 are contained in the bottom wall of the groove for expanding the friction drag spring 218. The sleeve is further provided with radially inwardly directed lugs 261 that slidably receive longitudinal spacer rods 262 that extend at each end beyond the sleeve in abutting engagement with the reverse and forward clutch elements 210 and 212, respectively, thereby maintaining constant the space between these clutch elements. As shown in FIG. 12, the lugs 261 extend into corresponding grooves contained in output shaft 202 and thereby connect the elements for simultaneous rotation. Thus, in operation, when the central driver is in the illustrated disengaged condition, rotation of the input shaft 206 causes central driver 216 to be driven (via the helical spline teeth 220a, 216c) and owing to the provision of the friction drag spring 218, the central driver is stabilized against undesirable axial displacement. Depending on the direction of rotation of the input shaft, the central driver is axially displaced by the automatic shift control means 228, 230 and 224 toward a readiness position adjacent the appropriate clutch member. Owing to the provision of the caged ball bearings 254, the axial frictional component produced by the friction drag spring 218 is eliminated, whereby the central driver member may be accurately shifted toward and maintained at the desired readiness position. It is important to note here that the helix angle of helical teeth 200a, 216c is preferably relatively low (on the order of 15°) to prevent the central driver from being pulled too far during an overrunning condition to prevent the central driver from engaging the teeth of the driven clutches too severely, and to avoid excessive thrust bearing wear. This low helix angle would ordinarily decrease the force available for shifting the central driver, but owing to the provision of the friction-reducing sleeve means, the central driver may be readily shifted from the readiness to the clutch engaged position.

Figure 15:
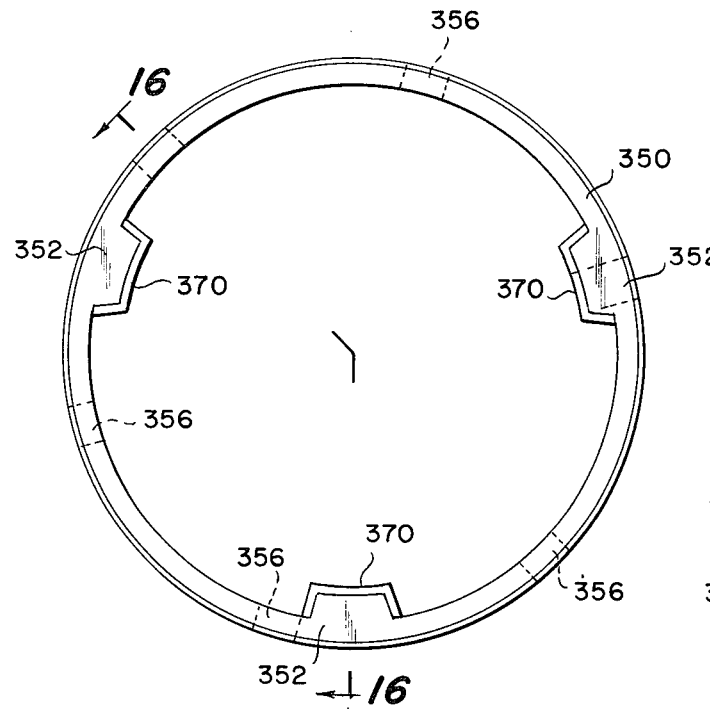
FIGS. 15–17 are sectional views of the friction-reducing splined sleeve means.
Figure 16:
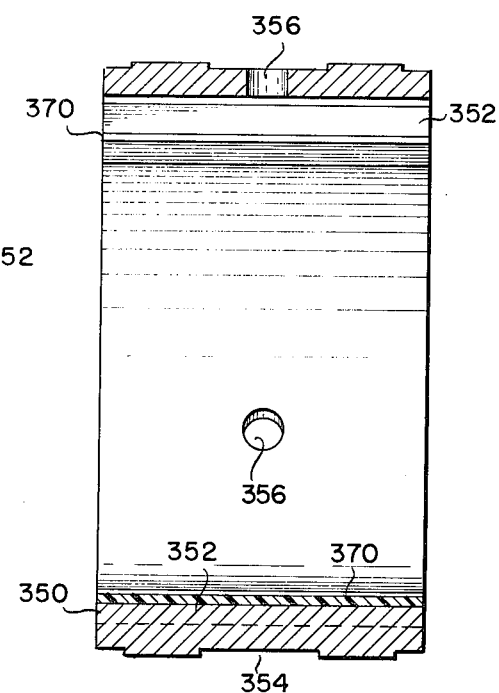
Figure 17:
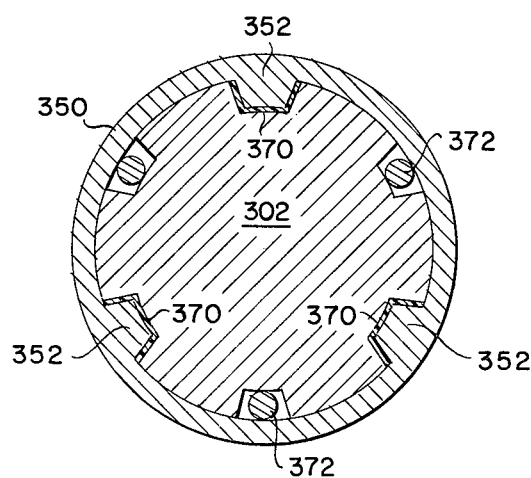

Referring now to FIGS. 13–16, the friction-reducing sleeve 350 is again arranged concentrically between the output shaft 302 and the central driver member 316, said sleeve having on its inner periphery splines that extend within corresponding grooves contained in the output shaft, thereby to connect the elements for non-rotatable axial sliding movement. In accordance with the present invention, layers 370 of a suitable synthetic plastic material having a low coefficient of friction (for example, nylon, polyvinyl chloride and the like) are adhesively or otherwise secured to the splines 352 as shown in FIG. 15, whereby the axial frictional component between the sleeve and the output shaft (and, consequently, between the friction drag spring and the output shaft) is eliminated. The outer periphery of the sleeve is provided with an annular groove 354 for receiving the friction drag spring 318, and also access openings 356 that afford means for expanding the friction drag spring. As shown in FIG. 17, the spacer rods 372 that extend at each end beyond the sleeve in abutting engagement with the clutch members 310 and 312 are received in longitudinal grooves contained in the output shaft 302.

While the invention has been disclosed in connection with a vehicle in which the front axle is intentionally caused to overrun the rear axle by a given amount (on the order of 3 to 6 percent), it is apparent that the reversible overrunning clutch may be applied to a vehicle whose front axle drives all the time and when it skids, the rear axle takes torque. Other changes and modifications may be made in the apparatus described without deviating from the inventive concepts set forth above.

What is claimed is:

1. In a reversible overrunning clutch means for driving an overrunning first motor vehicle axle when the rotational speed thereof fails to exceed the speed of a second axle by a predetermined slight amount, said clutch means including a housing (204); an output shaft (202) journalled in said housing, said output shaft being adapted for connection with one of said axles; a rotary input shaft (206) arranged for rotation adjacent said output shaft; reversible overrunning clutch means operable to connect said input shaft with said output shaft, including forward and reverse annular clutch members (210, 212) secured to said output shaft in axially spaced relation, an annular central driver member (216) rotatably mounted on said output shaft in spaced relation relative to, and axially slidable between, said annular clutch members, said central driver member having at opposite ends thereof clutch teeth of the self-disengaging overrunning type adapted to engage corresponding clutch teeth on said annular clutch members, respectively, friction drag spring means (218) connected between said output shaft and said central driver member for resisting rotational movement of said output shaft, and direction-responsive operating means (216c, 220a) connected between said input shaft and said central driver and said central driver member for axially shifting said central driver member in a direction corresponding with the direction of rotation of said driving means; and automatic shift control means (228, 230, 224) responsive to the direction of rotation of said driving means for positioning said central driver member in a readiness position immediately adjacent the corresponding one of said annular clutch members to insure the correct directional operation of said clutch means; the improvement which comprises means for reducing the axial friction between said friction drag spring means and said output shaft, including a. a sleeve arranged concentrically between said central driver member and said output shaft, said friction drag spring means being arranged for radially directed frictional engagement between the inner peripheral surface of said central driver member and the outer peripheral surface of said sleeve;

b. means connecting said sleeve for non-rotatable axial sliding movement relative to said output shaft; and c. friction reducing means connected with, and constrained against axial displacement relative to, said sleeve for reducing the axial component of friction between said sleeve and said output shaft.

2. Apparatus as defined in claim 1, wherein said friction reducing means comprises a stamped sleeve containing a plurality of circumferentially spaced openings; and further including a plurality of ball bearings rotatably caged in said openings, respectively, for rotational engagment with the inner peripheral surface of said central driver member.

3. Apparatus as defined in claim 2, wherein said non-rotatable connecting means comprises at least one radially inwardly directed lug contained on the inner peripheral surface of said sleeve, said output shaft containing on its outer periphery at least one longitudinal groove slidably receiving said lug.

4. Apparatus as defined in claim 3, and further including a spacer rod slidably mounted in aid lug in parallel relation to said output shaft, the ends of said spacer rod being in abutting engagement with the adjacent surfaces of said forward and reverse annular clutch members, thereby to maintain constant the spacing distance between said forward and reverse clutch members.

5. Apparatus as defined in claim 2, wherein said sleeve contains on its outer peripheral surface an annular groove for rotatably receiving a portion of said friction drag spring means.

6. Apparatus as defined in claim 1, wherein said non-rotatable connecting means comprises at least one longitudinal spline on the innr peripheral surface of said sleeve, said spline extending radially inwardly into a corresponding longitudinal groove contained in said output shaft; and further wherein said friction reducing means comprises a layer of synthetic plastic material secured to at least a portion of said longitudinal spline for engagement with said groove, said synthetic plastic material having a low coefficient of friction, thereby to reduce the axial frictional component of said drag spring means relative to the output shaft 7. Apparatus as defined in claim 6, wherein at least one of the adjacent peripheral surfaces of said sleeve and said output shaft contains a longitudinal groove; and further including a spacer rod contained in said groove in parallel relation to said output shaft, the ends of said spacer rods being in abutting engagement with the adjacent surfaces of said forward and reverse annular clutch members, thereby to maintain constant the spacing distance between said forward and reverse clutch members.

8. Apparatus as defined in claim 6, wherein said sleeve contains on its outer peripheral surface an annular groove for rotatably receiving a portion of said friction drag spring means.

* * * * *